O. G. MEREDITH.
ANIMAL TRAP.
APPLICATION FILED AUG. 18, 1920.
1,402,002.
Patented Jan. 3, 1922.
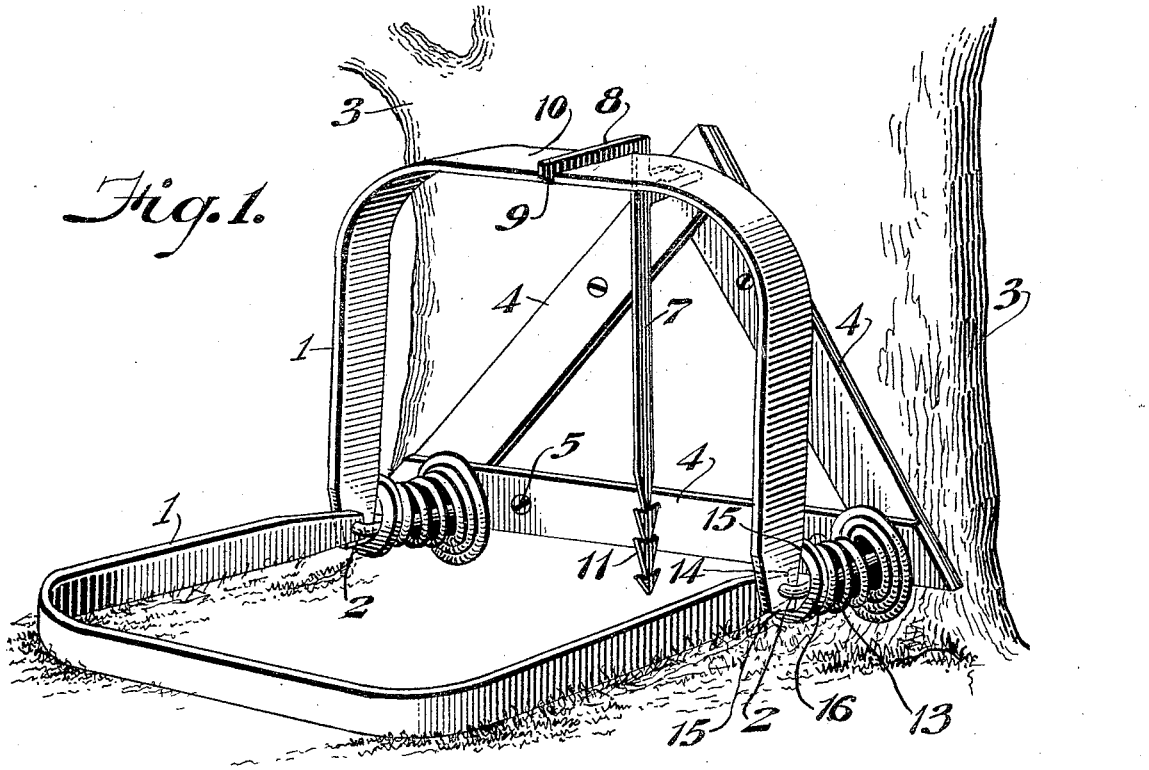
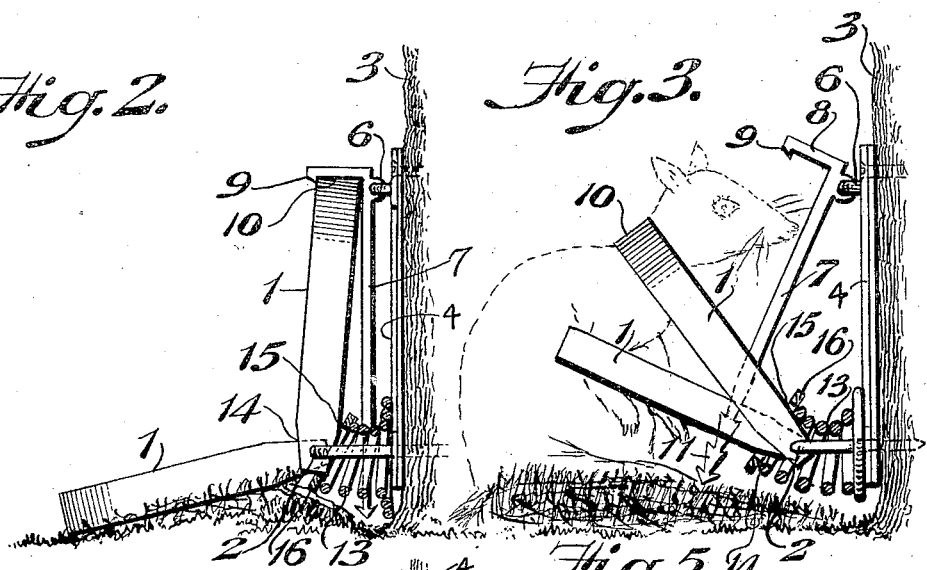
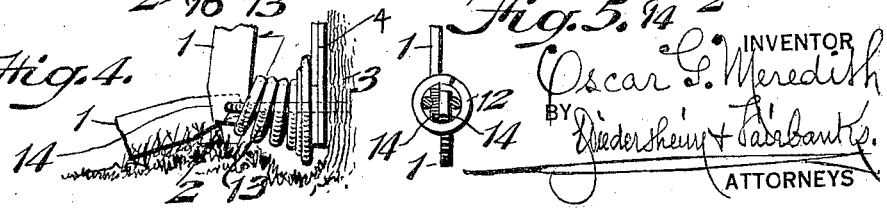
INVENTOR
Oscar G. Meredith
BY Wiedersheim + Fairbanks
ATTORNEYS

UNITED STATES PATENT OFFICE.

OSCAR G. MEREDITH, OF EAST GOSHEN TOWNSHIP, CHESTER COUNTY, PENNSYLVANIA, ASSIGNOR OF ONE-HALF TO HARRY F. TAYLOR, OF WEST CHESTER, PENNSYLVANIA.

ANIMAL TRAP.

1,402,002. Specification of Letters Patent. Patented Jan. 3, 1922.

Application filed August 18, 1920. Serial No. 404,337.

*To all whom it may concern:*

Be it known that I, OSCAR G. MEREDITH, a citizen of the United States, residing at East Goshen Township, county of Chester, State of Pennsylvania, have invented a new and useful Animal Trap, of which the following is a specification.

My invention consists of an animal trap which is composed of a pair of jaws, a trigger adapted to control the latter in the set position of the trap, a bait holder on said trigger, and springs adapted to close the jaws when said trigger is operated by the animal, said jaws having their pivotal ends tapered adapting them to allow the springs to ride over the same with the greatest freedom and reach the portions of the jaws without obstructions where they are to exert their pressure on the latter and quickly and powerfully close the jaws when the trap is sprung.

It consists also of a frame to which the trap is attached and which is adapted to be attached to the place of application of the trap in a uniform and steady manner, and have also the trigger of the trap mounted thereon as part of the unitary construction of the trap.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a trap as set embodying my invention.

Figure 2 represents a side elevation thereof the spring being in section.

Figure 3 represents a side elevation of the trap in sprung condition the spring being in section.

Figure 4 represents a side elevation of a portion of the trap.

Figure 5 represents an edge view of the pivotal portions of the jaws with parts in vertical cross section.

Similar numerals of reference indicate corresponding parts in the figures.

Referring to the drawings.

1 designates a pair of jaws which are substantially of U-shape connected at their jointed ends by the pivots 2 which are staple-shaped adapted to have their legs which form spikes or nails driven into or otherwise secured to a tree, stump, rail or other attachment 3, the crowns of said staples forming the bearings for the pivots of the jaws.

In order to strengthen the connection of the trap to said attachment, I employ the frame 4 which is secured thereto by the screws 5 or other means, portions of the legs of the pivots are passed through the lower bar of said frame and driven into said attachment, the latter having secured to its upper end the eye 6 on which is mounted as its bearing the trigger 7, the upper end whereof is of the form of an elbow 8, whose nose 9 is adapted to engage the crown 10 of the adjacent member of one of the jaws 1 so as to retain said member, and consequently the trap, in set condition.

The lower end of the vertical limb of the trigger is notched or serrated forming the bait holder 11 of the trap, which extends toward the ground to be within reach of the animal liable to be trapped.

On the legs of the staple-shaped pivots 2 are the coil springs 13 which are interposed between the lower bar of the frame 4 and the pivotal ends of the pair of jaws 1.

It will be noticed that said ends of the pair of jaws are tapered at 14 so as to be narrowed thereat whereby when the trap is sprung the forward convolutions of the springs will ride freely over said tapered ends and so quickly close the jaws, but when the trap is set the springs are compressed or contracted and the extreme front convolution of each spring will bear forcibly against the side edges 15 of the back of the outer jaw of the pair of jaws above the taper end portion, as best shown in Figures 1 and 2, this being the condition when the trap is set.

In order to guide the forward convolutions or coils of the springs over the tapering ends of the jaws, I place in front of said convolutions or coils the washers 16 whose diameters are sufficient to ride over said ends when pressed forward by the springs and reach the wide portions of the jaws and allow the front ends of the springs to follow them while they assist also to close the jaws and rigidly embrace the latter when so closed, as is most apparent in Figure 3. The washers have been removed from Figure 4 so as to show the spring bearing directly against the side edge of the outer jaw.

The operation is as follows:—

When the animal reaches the bait, the trigger is drawn to the front whereby the elbow thereof is raised and the nose 9 thereof is removed from the crown 10 of the upper jaw of the trap whereupon the jaws are no longer controlled by the said elbow. Then the springs become operative to expand when their forward convolutions ride over the bevel ends of both jaws and cause the latter to close, the upper jaw of the pair lowering and the lower jaw of the pair rising, the pair of jaws thus folding and their crowns catching or trapping the animal between them as plainly shown in Figure 3, it being noticed that the springs have ridden over the beveled ends with great freedom and without interruption so that they reach the side edges of both jaws of the pair above their pivots and so exert pressure on both jaws simultaneously, thus retaining the latter tightly in closed or sprung position preventing the animal from working the jaws open and releasing itself, the animal as seen being held in different portions of its body by the opposite crowns of the jaws.

Having thus described my invention what I claim as new and desire to secure by Letters Patent, is:—

1. In an animal trap of the character stated, a pair of jaws, pivots having bends engaging overlapping ends of said jaws and connecting the same and provided with legs which are adapted to be driven into the place of attachment of the trap, an attaching device, and springs fitted freely on said legs and interposed between said device and the pivotal portions of the legs and adapted to bear against the overlapping ends of the jaws.

2. In an animal trap of the character stated, a pair of jaws, a pivot connecting the same, and a spring on said pivot adapted to bear against the pivotal portions of said pair of jaws, said pivot being of the form of a staple whose crown forms the pivot for the bearings of said jaws, and whose legs form spikes to be driven into the place of attachment of trap.

3. In an animal trap of the character stated, a pair of jaws, a pivot for the same, having a crown on which the overlapped ends of said jaws are mounted, a spring adapted to close said jaws when the trap is sprung, a trigger adapted to engage one of said jaws, a bait holder on said trigger, a frame adapted to be connected with the place of application of the trap, and means on said frame forming the bearing and support for said trigger, said spring being fitted freely on said pivot and adapted to be seated against the adjacent portion of said frame.

4. In an animal trap of the character stated, a pair of jaws, a pivot for the same, a spring adapted to close said jaws when the trap is sprung, and a frame connectible with the place of support of the trap, said pivot having a bend on which the overlapped ends of the jaws are freely mounted and legs which comprise spikes which are adapted to be passed through the adjacent portion of said frame and driven into said support, and said spring being fitted freely on said pivot and adapted to be seated against the adjacent portion of said frame.

5. In an animal trap of the character stated, a pair of jaws, a pivot for the same, a spring adapted to close said jaws when the trap is sprung, a frame connectible with the place of support of the trap, said pivot having a bend on which the overlapped ends of the jaws are freely mounted and legs which comprise spikes which are adapted to be passed through the adjacent portion of said frame and driven into said support, and a trigger for controlling said jaws when the trap is set, said frame having means forming the bearing and carrier for said trigger, said spring being fitted freely on said pivot and adapted to be seated against the adjacent portion of said frame.

OSCAR G. MEREDITH.

Witnesses:
MARY H. DAVIS,
J. HARRY THOMAS.